No. 816,922. PATENTED APR. 3, 1906.
R. C. LANPHIER.
ELECTRIC METER.
APPLICATION FILED MAR. 9, 1904.
2 SHEETS—SHEET 1.
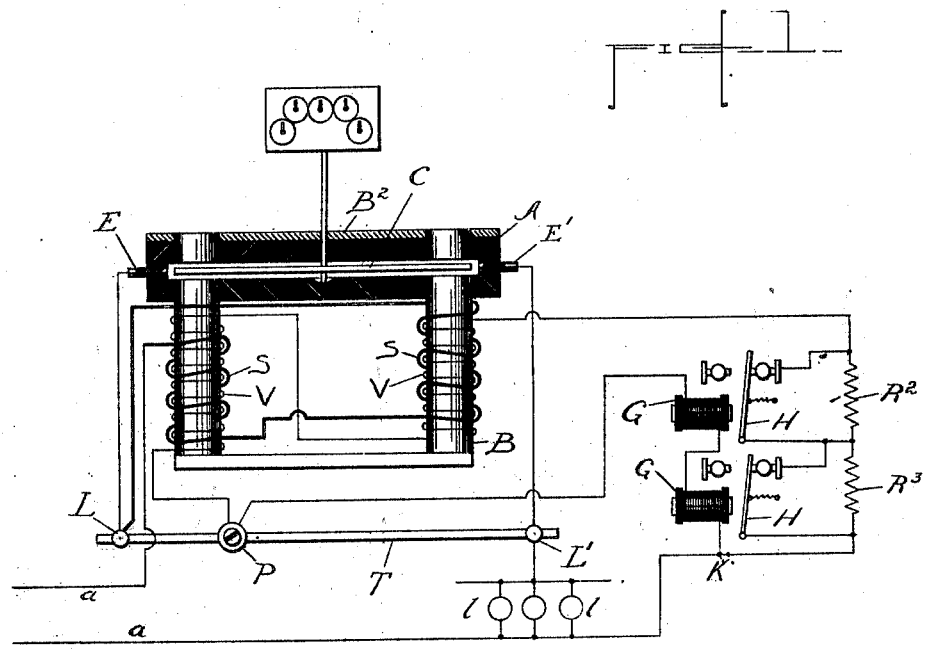
WITNESSES:
INVENTOR.
Robert C. Lanphier.
BY
ATTORNEYS No. 816,922. PATENTED APR. 3, 1906.
R. C. LANPHIER.
ELECTRIC METER.
APPLICATION FILED MAR. 9, 1904.
2 SHEETS—SHEET 2.
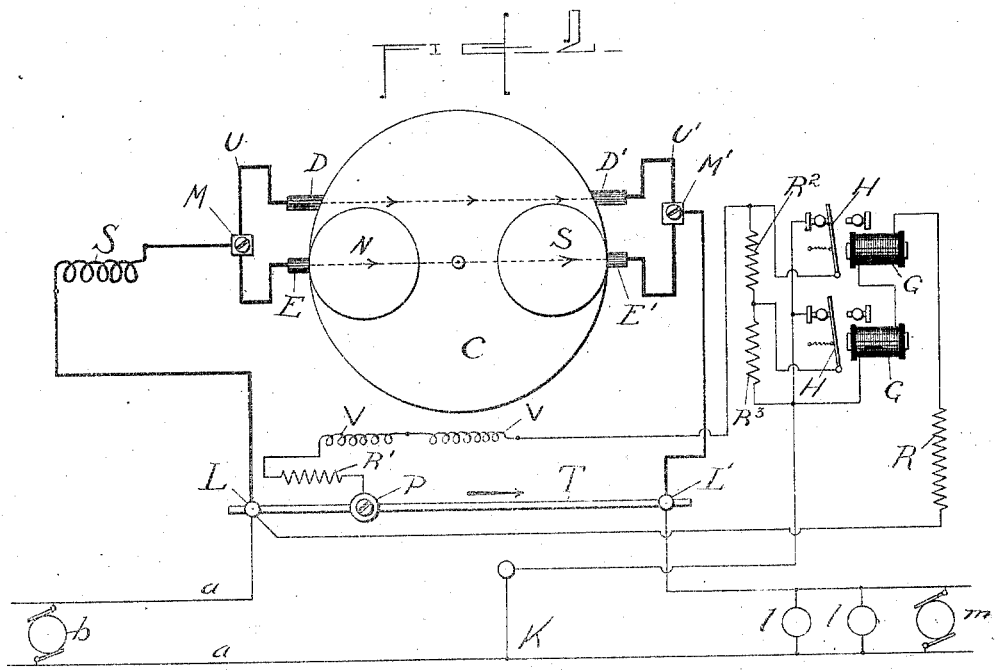
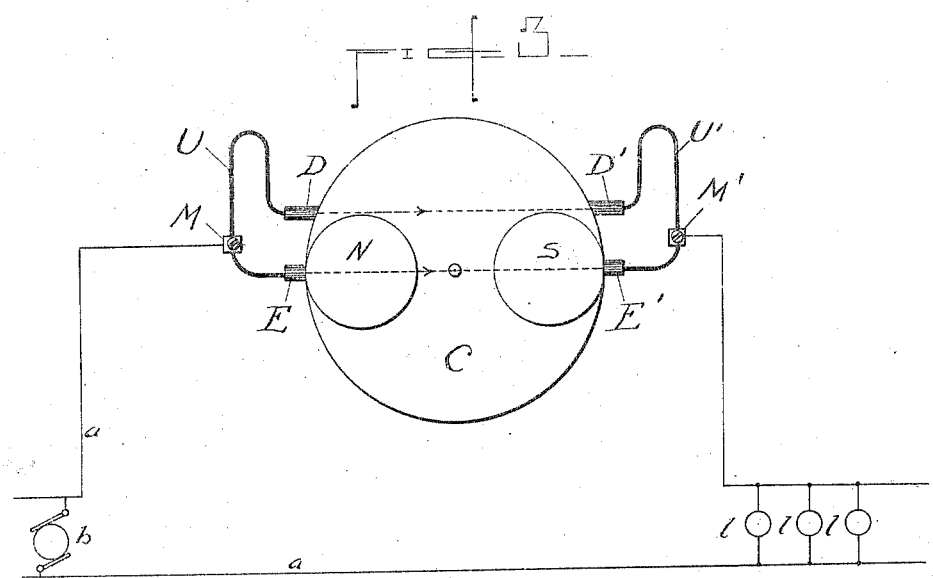
WITNESSES:
INVENTOR
Robert C. Lanphier.
BY
ATTORNEYS

UNITED STATES PATENT OFFICE.

ROBERT C. LANPHIER, OF SPRINGFIELD, ILLINOIS.

ELECTRIC METER.

No. 818,922.

Specification of Letters Patent.

Patented April 3, 1906.

Application filed March 9, 1904. Serial No. 197,308.

*To all whom it may concern:*

Be it known that I, ROBERT C. LANPHIER, a citizen of the United States, and a resident of Springfield, in the county of Sangamon and State of Illinois, have invented certain new and useful Improvements in Electric Meters, of which the following is a specification.

My invention relates to electric meters of the class in which an electric motor is employed, and the movements of the armature of said motor are indicated in a registry-train of wheels or on any suitable recording device.

My invention is designed more particularly to improve the action and provide convenient adjustment, under certain conditions hereinafter set forth, in that class of meters wherein the motor element consists of a rotary plate or shaft of metal of any desired form, preferably in the form of a disk, and rotating in a conducting liquid like mercury, the torque being produced by the reaction between the current passing through the mercury and plate and a suitable magnetic field produced by a magnet whose poles are presented to the plate or disk, as well understood in the art.

One of the objects of my invention is to provide a simple correction or compensation for the starting friction or for the factor of friction under light loads.

Another object of my invention is to provide means for adjusting the main speed of the motor for heavy loads.

A further object is to provide a correction or compensation for changes of temperature affecting the resistance of the circuits of the motor, so as to cause the motor to run either too slow or too fast.

In describing my invention I shall set forth the same as applied to a motor wherein the torque-producing field is due to a magnet supplied with current from the constant-potential mains, that also supply current to the work the consumption of current in which is to be measured, the work-current being carried through the disk or plate of metal and mercury and passed through the magnetic field or fields maintained by the current derived from the constant-potential mains.

The first part of my invention consists in an improved means for giving a meter of this general type a starting torque or a torque which shall compensate for the friction on light load. This part of my invention also provides a ready means for adjusting this starting or light-load torque. This part of the invention consists, substantially, in so connecting up the shunt or pressure coils which produce the field that current shall flow through the armature or disk and through said field-coils independently of the load or work, thus generating more or less reacton on "no load" and tending to overcome friction. This part of the invention also consists in combining with the disk or armature a suitable shunt around the terminals thereof and means for connecting the terminal of the pressure-field-coil circuit thereto at variable points to vary the distribution of currents and the amount which shall flow through the armature and through said pressure-field-coil circuit in series, thereby making it possible to adjust the light-load starting torque.

My invention consists, further, in a main speed adjustment comprising substantially two torque-producing armature-circuits and means for adjusting the proportion of current in said paths or circuits. In carrying out this part of my invention I employ two torque-producing armature circuits or paths adapted, respectively, to produce different torques and provide suitable adjustable resistances outside the armature for varying or adjusting the proportion of the current flowing in said paths respectively.

Another part of my invention relates to a compensation or correction for changes of temperature, and, briefly stated, consists of the combination with the armature-circuit of a branch or multiple path comprising a resistance metal that has a different coefficient from that of the path for the current through the armature, these multiple paths being so proportioned or adjusted that the change in the distribution of current due to a change of temperature will be such as to compensate for the tendency of the meter to run slow or fast, as the case may be, when the temperature and resistance of the armature-path is changed.

In the accompanying drawings, Figure 1 is a vertical section showing the constituent parts of the motor itself and some of the associate circuits. Fig. 2 is a general diagram of circuits and apparatus embodying my invention. Fig. 3 illustrates a modification in the means for securing a correction for changes of temperature.

Referring to the drawings, the usual liquid-tight case for a motor of the type already described is indicated at A, while C indicates the rotary metal plate or disk immersed in mercury or other suitable conducting liquid contained in the casing A, through which disk and the contained mercury the load-current or fixed fraction of the load-current is passed by means of suitable leads or terminals E E', which may be embedded in the casing and project through the walls thereof into contact with liquid, as well understood in the art.

B indicates the magnet which provides the magnetic field and which may be a horseshoe or other form of electromagnet having its poles in close proximity to the armature, for which purpose they may be embedded in the floor or wall of the casing in the usual manner.

It is convenient ordinarily to have the poles (represented, respectively, by letters N S in the diagram) presented to the armature on a diametrical line including the center of rotation of the disk and at opposite sides of the center, as shown, in which case the torque of the rotating member will be due to the combined reaction between both of said poles and the current circulating diametrically through the disk or armature and contained mercury. As well understood in the art, however, the direction or path of the current depends upon the relative polarity and disposition of the magnet-poles, and such disposition and polarity may obviously be varied without departing from my invention.

The energizing-coils of said magnet B are represented at V, and these are pressure or shunt coils excited by current from the constant-potential mains in the usual manner.

In conjunction with the poles of the magnet B an iron plate or armature B² may be applied over the disk and have projections extending down into close proximity to the upper face thereof opposite the poles of the magnet B, so as to produce a magnetic circuit having narrow gaps, in which the disk rotates and so that the current supplied through the leads or terminals E E' shall flow in a manner to set up a torque or tendency to rotation of the armature and contained liquid.

S in Fig. 1 indicates a coil or coils suitably wound and traversed by the load-current in such manner as to tend to oppose the effect of the coils V and cut down the strength of the field in which the armature rotates. These coils are connected into circuit, as shown in the diagrams, or in any other suitable manner, and their office is to compensate for the tendency of the class of motors herein shown and described to run slow with increasing load. This coil, applied and operating as just stated, however, forms no part of my present invention. The coils V being operated by current taken from the constant-potential mains necessarily depend for their effect upon that voltage and for the perfect operation of the meter should have a constant effect, which they would have if the voltage were at all times constant. As, however, in practice the voltage varies, a compensation is provided to keep the action of the magnets B constant despite variations of voltage and this compensation is afforded, as described more particularly in my application, Serial No. 187,111, filed December 30, 1903, by a variable resistance comprising one or more sections R² R³, thrown into and out of circuit with the coils V by means of controlling-electromagnets G, so connected to the circuit as to vary in their effect with the voltage, and each having the retractor of its armature H so adjusted that they will respond consecutively to consecutive increases of voltage. The coils R² R³ are high-resistance coils; but, if desired, additional artificial resistance R' may be introduced in the circuit with them and with the pressure-coils V V for the motor. Under the ordinary conditions—that is to say, when the voltage on the mains is at normal—the sections of resistance R² R³ are both cut out of circuit on the back contact of the armatures H. Assuming that the normal voltage is, say, one hundred, the upper magnet of the tier or the armature thereof would be so adjusted as to act at, say, one hundred and three volts, thus cutting in one of the sections of resistance and restoring the effect of the magnets B to that which would be the normal effect with the normal voltage. At a further increase of voltage—say to one hundred and six volts—the second magnet G would act and cut in another section of resistance, with the same effect, and so on for other voltages, magnets, and sections of resistance, the effect being in each case to introduce a correction for the increase of voltage across the mains from which the energizing-current of the coils V V is derived, so as to regulate the strength of the field produced by said coil and keep it practically constant. In the diagram the mains a a, connected to dynamo or other source b, furnish current to a load typified at l m as lamps and motors. In that diagram the main-entrance posts for the load-current are indicated at L L', across which is connected any sort of variable-resistance device, which in order to accomplish other objects hereinafter referred to I prefer to make of some metal which has no temperature coefficient or a negative coefficient. By the circuits between the terminals L L' it will be seen that the disk C of the motor is included in the circuit from L to L' and that the circuit continues from the latter through the load to the opposite main a. The shunt connection which takes place in the pressure-coils V may be tapped in by a connection P ahead of the disk C—as, for instance, by bringing the connection up close to the point L it is obvious that when no load is on or when there is very little load there would be no reaction between the shunt-field and armature tending to produce torque; but if the connection be made nearer the terminal L', so that the current or some of the current which is taken by the shunt-fields V will pass through the armature, then there will be a reaction, which, even if there be no load on, will give a starting torque, which may be adjusted to be sufficient to overcome the starting friction or may be adjusted to compensate for the greater value of the factor of friction at light loads than at heavy loads. This adjustment, in case the bar T be a resistance-bar, can obviously be effected by moving or adjusting the terminal P, which may be a rider or slide adjustable on the bar, so as to vary the proportion of shunt-current passing through the disk C and shunt-coils V in series. So far as this part of my invention is concerned the bar T and the rider or slide P typify simply any means for variably shunting the current into the pressure-coil circuit V. The bar T should ordinarily be of somewhat higher resistance than the disk-circuit—say one-half ohm resistance.

If the connection were made nearer the terminal L or near some point of practically the same potential as the lead E, it is evident that none of the current passing through coils V will pass through the disk C; but if the connection be made near the terminal L' or at some point approximating the potential at the lead E', then practically all the shunt-current exciting the pressure-fluid magnet will pass through the disk and give the maximum reaction for light loads. It is plain, therefore, that with the adjustment of resistance by means of the movable terminal P, moving on the resistance-bar or other form of resistance, the compensating effect for light load will vary, depending upon the relative distance of said connection P from the terminals L L', thus providing a very simple and easily-controlled adjustment sufficient for any ordinary friction on light loads and one which will not affect in any way the main adjustment of the motor.

In the drawings, Fig. 2, the shunt-coil circuit V is shown tapped alone by the connection P to the circuit, and the regulator-magnets G are in an independent connection from the terminal L to K. For the greatest effect both the shunt-coil and the regulator-magnets would be tapped in by connection P, as indicated in Fig. 1. In the circuit of the magnets G there may be interposed, as shown, a high resistance R in series with them to cut down the "loss" current through the coils of said magnet.

To obtain a simple and easily set adjustment for heavy loads, I provide the following devices whereby the proportion of main current passing through the portions of the torque-producing pressure-field may be varied. For this purpose I provide the additional leads D D', by which armature-current may be passed in another branch or circuit in shunt to the main armature-current furnished through leads E E'. The leads D D' are applied at such points that preferably the torque produced by that current shall be less than that produced by the current flowing from lead E to lead E'. If all the current entered at E and left at E', the greatest torque for a given strength of field would be produced; but if all the main current passed from D to D' the torque would be much less—say only one-third of the maximum.

By adjusting the proportions of main current passing through the divided path, as described, the meter speed can be varied over a very wide range with perfect uniformity. This adjustment is preferably effected by the use of variable resistance joining the two pairs of lead-wires and combined with suitable sliding contacts or terminals M M', adjustable over said resistance. Conveniently this resistance may be composed of a bridge or loop of wire U, upon which the slides or riders M are adjustable, said bridge or loop having by preference a resistance about equal to the sum of resistances in the two armature-current paths. It is obvious that one or both sides may be used to obtain the desired adjustment. If the connection be made at points nearer E E', the greater part of the current will pass through the main armature-current path E to E', whereas with the adjustment nearer D and D' the greater part will pass through the other torque-producing armature-circuit.

It will be understood that the wires U and U' and adjustable riders M M' are to be taken as typical of any adjustable resistance or means for varying the proportion of current in the two armature-circuit branches.

As is well known in the art, the speed could be varied by having an ordinary shunt from E to E' outside the meter disk-box and of adjustable resistance; but the trouble with such a device would be the tendency to error at different temperatures or even at heavy loads with uniform temperature, for the resistance of the current-path through the disk and mercury would have a temperature coefficient differing from any shunt which could well be used; and any heating of the shunt or the mercury and disk would introduce an error. A correction for error under these conditions, as well as with a main speed adjustment, as I have already herein described, and for other conditions, may be obtained by the use of a compensating shunt of a resistance metal having a lower or different temperature coefficient from that of the circuit in which the torque-producing current flows, as will be now described in two of its special applications.

In a mercury motor-meter, for example, of the type described there is a rather large temperature error to be overcome, arising from the fact that the shunt or pressure coil would ordinarily be of copper wire, with perhaps some external resistance, either of iron or special resistance wire, while the disk itself would be of copper also. Assume that such a meter has been calibrated at a temperature, say, of 70° Fahrenheit. If the temperature decreases to 30° Fahrenheit the shunt-coils will decrease in resistance about eight per cent. Therefore the shunt-field will increase proportionately. Likewise the disk resistance has decreased, so that the Foucault currents generated in it by the shunt-field as disk sweeps across will increase in volume both on account of this lower resistance and the stronger field. The drive on the disk or torque will only increase on account of the stronger shunt-field, so that the net result will be to cause the meter to run perhaps eight to ten per cent. slow. Likewise on an increase in temperature to 110° Fahrenheit the meter will run about the same proportion fast.

My plan of temperature compensation is to vary automatically the proportion of main current acted upon by the shunt-field, increasing this on decreasing temperature from the normal, and vice versa.

According to the special plan embodying the part of my invention illustrated in Fig. 2 the speed-adjusting means and the correction for changes of temperature are practically combined, as illustrated in Fig. 3. In this case the loops U U' are of a resistance metal that has almost no temperature coefficient over a great range.

As before, the main speed adjustment may be had by moving line-taps M and M' along U and U'; but the loops or bridges are chosen of such length that with proper speed adjustment the taps M and M' will always be much nearer E and E' than to D and D'. Now assume meter correct. Then when temperature decreases the resistance to the current along path from E to E' will decrease more than that through the loops U and U' and from D to D'. Hence more current at a given load will flow along the line of maximum torque from E to E' and speed of meter will be increased to compensate for tendency to run slow. Vice versa, on an increase of temperature above the calibration temperature more current will be carried from D to D' in proportion than from E to E', and meter speed will decrease so as to remain correct.

In place of combining the main load adjustment and the temperature compensation I may use the former as first described, having U and U' of copper, so as to vary with temperature like the disk and shunt coils. Then at all temperatures the relative amounts of current passing from E to E' and D to D' remains the same, so that the speed is not corrected for temperature. In this case outside shunt T bridging the meter may be of the special resistance-wire, as above. Evidently if the outside resistance is properly adjusted to the meter resistance from L to L' the proportion of current passing through the disk will be properly varied for changes in temperature, as the outside resistance does not change.

What I claim as my invention is—

1. The combination in a mercury motor-meter, of an armature-circuit adapted to carry the work-current, and a pressure-field-coil circuit connected to such armature-circuit so that more or less of the pressure-current shall pass through the path of the work-current in the armature or disk and produce a light-load starting torque.

2. The combination in a mercury motor-meter, of an armature, a pressure-field coil having series connection therewith and means for varying the relative amount of pressure-field current passing through the armature.

3. In a mercury motor-meter, the combination with an armature-circuit carrying current varying with the work, of a pressure-field-coil circuit having series connection therewith, and means for varying the proportion of pressure-field-coil current passing through the armature.

4. In a motor-meter of the type described, the combination with the armature-circuit, of a branch around the same, a pressure-field-coil circuit and means for connecting the terminal thereof to said branch at different points to determine the amount of current that shall flow through the armature and pressure-field coil in series to produce the starting torque.

5. In a meter of the type described, the combination of two main-current armature-paths in multiple and in which the currents conspire to produce rotation and means for adjusting the proportion of current flowing through said paths.

6. In a meter of the type described, the combination of two main-current armature-paths in which the currents conspire to produce rotation and means for adjusting the proportion of current flowing through said paths.

7. In a mercury motor-meter, the combination with the main armature-circuit, of a supplemental armature-circuit producing a lesser torque and means for changing the distribution of current in said circuits to adjust the action of the meter for different loads.

8. In a mercury motor-meter having a constant-pressure field-coil of two main-circuit armature-paths and means for changing the proportion of current flowing through said paths to adjust the action of the meter for different loads.

9. In a mercury motor-meter, the combination with the two armature-paths, of the bridging resistance and means for adjusting the connection of the meter-circuit with said resistance to vary the distribution of current in the two paths.

10. In a mercury motor-meter, the combination of a pressure-field coil in which the current increases with a decrease of temperature, an armature-circuit and a shunt or branch around the same having a lesser temperature coefficient than that of the armature, said shunt being adjusted as described to compensate for the tendency of the meter to run slow when the current in the armature and shunt-field coil increases owing to decrease of temperature below that for which the meter is calibrated.

11. In an electric meter, the combination with two armature-circuits having different torque-producing effects, said circuits being connected by loops or branches embodying a metal having a lower temperature coefficient than the armature-paths themselves.

12. In a mercury motor-meter, the combination of a torque-producing field-coil operated by shunt-current, a branch around the motor embodying a metal having a different temperature coefficient than that of the armature-path and means for connecting the pressure-coil circuit to said branch at different points to vary the amount of current that shall produce a light-load or starting torque.

Signed at Springfield, in the county of Sangamon and State of Illinois, this 11th day of February, A. D. 1904.

ROBERT C. LANPHIER.

Witnesses:
BERTHA O. LANPHIER,
JACOB BUNN.